March 5, 1968
C. D. NELSON
3,371,596
BALE LENGTH CONTROL DEVICE
Filed Oct. 12, 1966
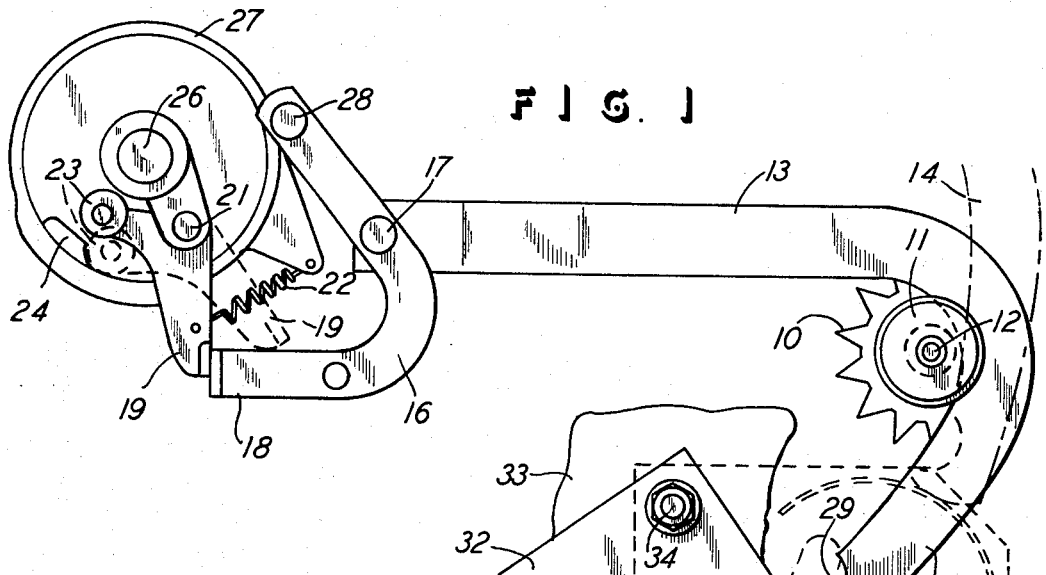
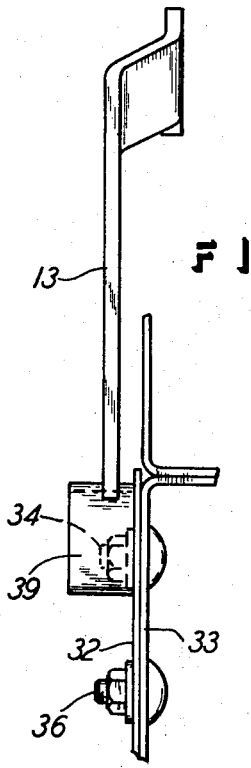
INVENTOR:
CARL D. NELSON
BY Arthur J. Hansmann
ATTORNEY

United States Patent Office 3,371,596
Patented Mar. 5, 1968

3,371,596
BALE LENGTH CONTROL DEVICE
Carl D. Nelson, De Witt, Iowa, assignor to J. I. Case Company, Racine, Wis., a corporation of Wisconsin
Filed Oct. 12, 1966, Ser. No. 586,109
3 Claims. (Cl. 100—4)

This invention relates to a bale length control device.

Control devices for regulating the length of a bale of hay are already known. These devices generally include a measuring arm which is movable between one limit position and a trip position to thereby actuate a clutch which controls the bale tying mechanism. The prior art includes various means and devices for setting and governing the one limit position of the arm. These prior devices are adjustable stops which are disposed to be in abutment with the measuring arm to limit the movement of the arm and thereby govern the bale length. A general example of this baler mechanism and the utilization of a stop for the measuring or control device is shown in U.S. Patent No. 2,911,904. Even more pertinent than said patent with regard to the stop, is a stop construction which is simply a movable angle or bracket adjustable toward and away from the end of the bale control arm to govern the distance the arm will fall after actuating the tying mechanism. This controlled distance of fall will in turn control the length of the bale. The present invention has to do with the construction and function of the stop of a type adjustable on the baler for abutting and thereby limiting the movement of the measuring arm.

It is a general object of this invention to provide an improved bale length control device, and to do so in a manner which is relatively simple, inexpensive, and easy to operate.

A more specific object of this invention is to provide a bale length control device which offers a wide range of adjustment for correspondingly varying the length of the bales of hay, as desired.

Still another object of this invention is to provide a bale length control device which is readily and easily set in its adjusted position, is readily and easily secured in its adjusted position, and can be accurately set without requirement of special tools or trial and error to determine the desired setting.

Still other objects of this invention include the provision of a bale length control device which maintains its desired position for alignment of the stop with the measuring arm, no parts need be removed while making the adjustment and the parts are not subject to being lost, and the improved stop which forms a component of the combined control device can be readily adapted to already existing control devices.

Other objects and advantages become apparent upon reading the following description in light of the accompanying drawings, wherein:

FIG. 1 is a side elevational view of a bale length control device of this invention, and showing parts thereof in different positions in dotted and dot-dash lines.

FIG. 2 is an end elevational view of FIG. 1, with the stop thereof in the raised position.

A hay baler normally includes a toothed wheel 10 rotatably disposed adjacent the bale case through which the hay is passing. The bale engages the wheel 10 to rotate it in a counter-clockwise direction in FIG. 1, and to therefore correspondingly rotate the measuring wheel 11 which is mounted on a shaft 12 along with the wheel 10. In the usual manner, the measuring wheel 11 engages the bifurcated bale measuring or trip arm 13, and this can cause the arm 13 to move from the lower solid line position, in its lower end portion 14, to the upper dot-dash line position.

The usual dog clutch arm 16 is pivoted to the trip arm 13 through a pin 17, and the described movement of the trip arm 13 causes the dog arm 16 to drop at its end 18. A clutch dog 19 is pivoted on a pin 21, and can then move to the dotted position shown when the clutch dog arm drops in the usual manner. A tension spring 22 moves the clutch dog to the dotted position when it is released by the clutch dog arm as described.

A clutch dog roller 23 is also included in the clutch dog 19, and it drops to the dotted position shown and against the clutch ring stop 24.

This actuates the baler tying mechanism in that it trips the knotter and moves the needles into the baler case or chamber, all in a conventional manner and these parts are therefore not further shown. The tying mechanism clutch is thus shown, and the described parts and action with respect to the clutch dog 19 therefore causes the rotation of a tying mechanism shaft 26 and the clutch member 27 has also been rotating. The upper end of the clutch dog arm 16, on shaft 28, carries a roller (not shown) which rides on a surface of the clutch and engages a cam, such as the usual cam surface included in the clutch, and this therefore causes the clutch dog arm to move back into engagement with the clutch dog 19 when the latter again comes around. This disengages the clutch to stop the tying mechanism, and all is in the well-known manner, such as shown in Patent 2,911,904.

Also as is customary, the trip arm 13 has a notch 29 in the lower end 14, and this notch causes the trip action described when it reaches the position of alignment with the shaft 12 of the measuring wheel 11.

The particular contribution of this invention is in the provision of the stop generally designated 31. Here it will be noted that a plate 32 is secured to the baler side 33 by means of a pivot bolt 34 and a securing bolt 36. These are of course preferably carriage type bolts, and they can be readily loosened and tightened because the nuts 37 on the bolts 34 and 36 are exposed to the exterior of the baler, as shown.

The plate 32 therefore pivots about the axis of the bolt 34, and an arcuate slot 38 is provided in the plate 32 for reception of the bolt 36 to thus guide the pivot action and both limit it and provide for securing the plate in any selected pivoted position. The stop 31 also has an abutment or arcuate surface 39 affixed thereto and projecting to the side of the plate 32, as shown best in FIG. 2. This surface 39 is thus aligned with the measuring arm 13, and is particularly in abutting engagement with the lower edge 41 of the arm 13. The surfaces 39 and 41 are both arcuate and of opposite curvature or convex with respect to each other. This provides for the desired accuracy in limiting the movement of the arm 13 and for good contact and minimum wear between the parts.

The dotted position of the stop 31 shows that it can be raised from the lower solid line position, and thus limit the fall of the arm 13. It will be further understood that it is the distance which the trip arm 13 moves from the point of contact with the abutment surface 39 to the point where the notch 29 is received in the measuring wheel 11 that determines the length of the bale. Thus the maximum length of bale is in the longer stroke or movement of the arm 13, and that would be the solid line positions shown in FIG. 1, and the shorter length of bale is established by the shorter movement of the arm 13, and that would be in the dotted and dot-dash lines of FIG. 1.

This form of stop gives a desired range of length in bales, namely, from eighteen inches to fifty inches difference in lengths. It also gives an accurate setting in that the stop 31 is movable along its arcuate slot 38, and it presents the arcuate surface 39 to the trip arm 13. Therefore, the two arcs provide accurate settings.

While a specific embodiment of this invention has been shown and described, it should be obvious that certain changes could be made in the embodiment and the invention should therefore be determined only by the scope of the appended claims.

What is claimed is:

1. In a bale length control device for use on a hay baler of the type having bale tying means, the improvement comprising a movable trip arm for controlling said tying means, a stop having an abutment surface disposed transverse to and in the path of movement of said trip arm, a pivot mounting for said stop, combined pivotal limiting and securing means connected to said stop for holding the latter in selected pivotal positions, said abutment surface being sufficiently extended and the pivot axis of said stop being located with respect to the path of movement of said trip arm to have said abutment surface abut said trip arm in all pivotal positions of adjustment of said stop.

2. The subject matter of claim 1, wherein said combined pivotal limiting and securing means is an arcuate slot in said stop centered with respect to said pivot axis and includes a bolt and a nut for releasably securing said stop in selected pivotal positions.

3. The subject matter of claim 2, wherein said abutment surface is arcuate and is disposed in abutment with and presents a convex surface to the end of said trip arm for limiting movement of said trip arm in one direction, and wherein said trip arm end is arcuate and presents a convex surface to said abutment surface.

References Cited

UNITED STATES PATENTS

| | | | |
|---|---|---|---|
| 2,516,742 | 7/1950 | Adkisson | 100—4 |
| 2,911,904 | 11/1959 | Weiss | 100—4 |
| 2,981,173 | 4/1961 | Nolt | 100—4 XR |
| 3,221,639 | 12/1965 | Rimmey | 100—4 |

BILLY J. WILHITE, *Primary Examiner.*